United States Patent [19]

Bodenbenner et al.

[11] 4,157,381
[45] Jun. 5, 1979

[54] PROCESS FOR REGENERATION OF SULFURIC ACID

[75] Inventors: Kurt Bodenbenner, Wiesbaden; Gerhard Müller, Kelkheim; Heinrich Müller, Neu-Isenburg, all of Fed. Rep. of Germany

[73] Assignee: Hoechst Aktiengesellschaft, Frankfurt am Main, Fed. Rep. of Germany

[21] Appl. No.: 942,264

[22] Filed: Sep. 14, 1978

Related U.S. Application Data

[63] Continuation of Ser. No. 817,424, Jul. 20, 1977, abandoned.

[30] Foreign Application Priority Data

Jul. 22, 1976 [DE] Fed. Rep. of Germany ....... 2632989

[51] Int. Cl.² .................... C01B 17/90; C01B 17/72
[52] U.S. Cl. ................................... 423/525; 423/529; 423/531
[58] Field of Search ............... 423/522, 525, 526, 527, 423/528, 529, 531

[56] References Cited

U.S. PATENT DOCUMENTS

| | | | |
|---|---|---|---|
| 3,294,650 | 12/1966 | Manteufel | 423/531 |
| 3,992,247 | 11/1976 | Bodenbenner et al. | 423/531 |
| 4,010,240 | 3/1977 | Von Plessen et al. | 423/531 |

FOREIGN PATENT DOCUMENTS

| | | | |
|---|---|---|---|
| 2352701 | 6/1975 | Fed. Rep. of Germany | 423/531 |
| 441452 | 4/1934 | United Kingdom | 423/525 |
| 512907 | 9/1939 | United Kingdom | 423/531 |

Primary Examiner—O. R. Vertiz
Assistant Examiner—Gary P. Straub
Attorney, Agent, or Firm—Curtis, Morris & Safford

[57] ABSTRACT

The invention provides a process for the regeneration of dilute sulfuric acid containing organic impurities and possibly also inorganic salt in several steps. In the first step, the dilute acid is concentrated by indirect heat exchange with the vapors of the second step, and in the second step it is concentrated by direct heat exchange with a countercurrent mixture of steam and acid vapors coming from a third step. In this third step, the acid discharged from the second step is mixed in direct heat exchange with superheated steam. The regenerated sulfuric acid is separated from this mixture and the remaining steam/vapor mixture is forwarded to the second step. In the case where the dilute acid contains organic substances, an oxidant is added in at least one of these process steps.

4 Claims, 1 Drawing Figure

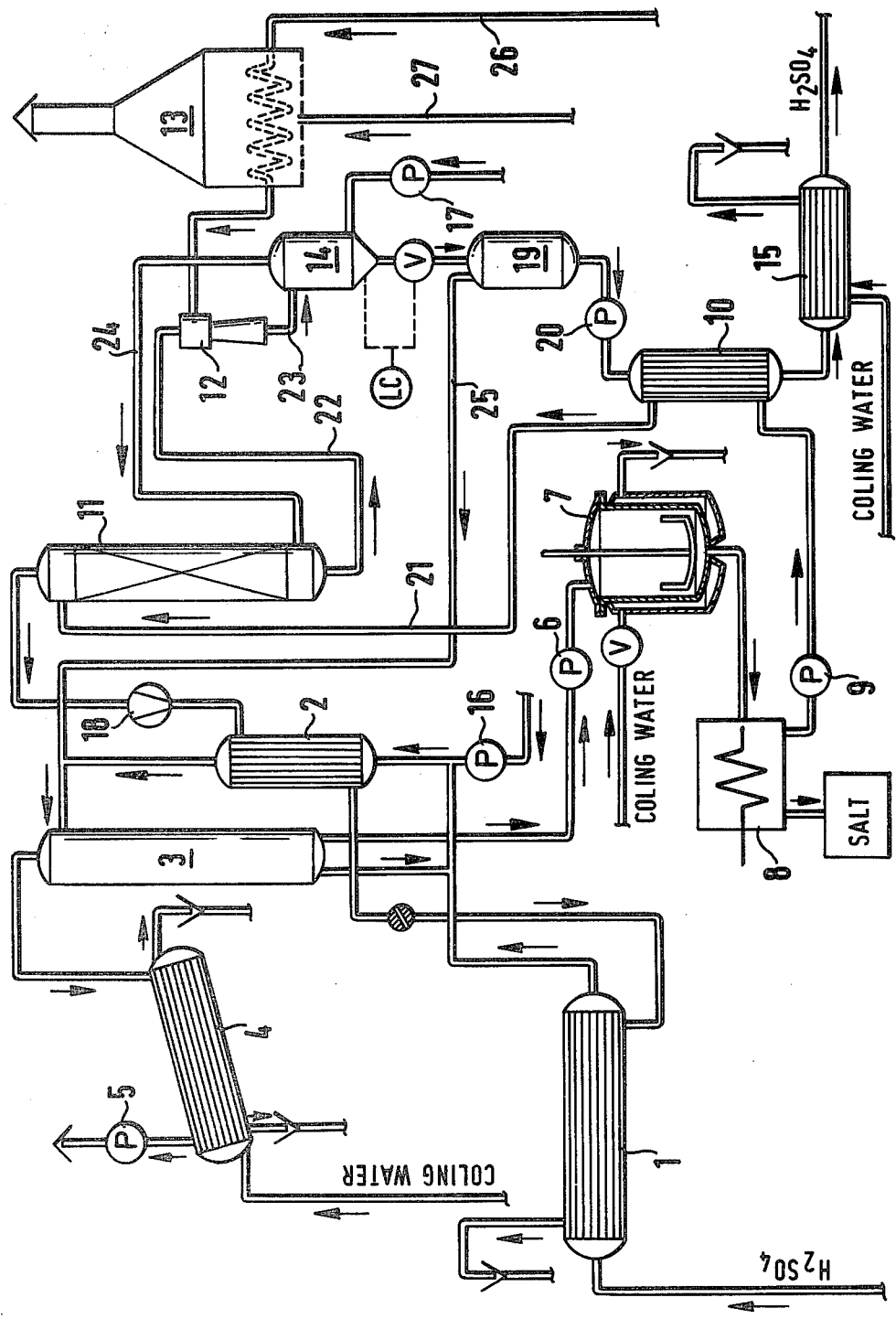

PROCESS FOR REGENERATION OF SULFURIC ACID

This is a continuation of application Ser. No. 817,424, filed July 20, 1977, now abandoned.

The present invention provides a process for the regeneration of dilute sulfuric acid containing organic impurities and possibly also inorganic salt.

From German Offenlegungsschrift No. 23 52 701, it is known that dilute sulfuric acid may be concentrated in a two-step process by treating with superheated steam. In the first step, the dilute sulfuric acid is evaporated in a circulating cyclone evaporator by means of the vapors of the second step, and subsequently, in the second step, it is concentrated directly with superheated steam to its final concentration. The disadvantages of this process are that the concentrated sulfuric acid is of only 80% strength, and that organic impurities present in the dilute acid are not eliminated by this method.

It is therefore the object of the present invention to provide a process which is not affected with the above disadvantages.

In accordance with this invention, there is provided a three-step process for the regeneration of dilute sulfuric acid containing organic impurities by concentration of the dilute acid in the first step by indirect heat exchange with the vapors of the second step and by direct heat exchange with steam in the second step, which comprises a. forwarding the acid leaving the first step to the second step and concentrating it with a countercurrent flow of a mixture of steam and acid vapor;

b. treating the acid leaving the second step in a third step with superheated steam in direct heat exchange, separating the regenerated acid and forwarding the remaining mixture of steam and acid vapor to the second step, while adding an oxidant in at least one of these steps.

In the case where the sulfuric acid to be regenerated still contains salt, the acid leaving the first step may be cooled before it is forwarded to the second step, and the precipitated salt may be separated. In order to increase the concentration and to recover heat, the regenerated acid may be depressurized in a subsequent flash chamber and the steam/acid vapor mixture so formed may be recycled to the first step. Under the conditions of the process of the invention, the non-volatile organic compounds may be oxidized by means of a suitable oxidant to form low molecular weight substances which are than eliminated from the hot acid by means of the steam. This oxidation may be carried out either in all three steps or in any one of them individually. Suitable oxidants are nitric acid, hydrogen peroxide, Caro's acid etc., which may be used per se or in mixture with each other, or one after the other.

Alternatively, an anodic oxidation may be advantageous. In any case, the acid to be regenerated should not be contaminated further. In the case where aggressive gases are formed as reaction products, for example when nitric acid is used, the waste gas must be purified. This purification may be accomplished by known methods for the elimination of nitrous gases, such as stepwise scrubbing with water.

When the acid contains organic substances which incite foaming during the concentration process and thus would make it difficult or impossible to apply the process of the invention, oxidation in the first step substantially prevents any foaming.

The amount of oxidant depends on the content of organic substances. However, it has to be taken into consideration that easily volatile compounds must not be oxidized necessarily in order to obtain a pure acid. These volatile compounds are found later in the condensate, from which they have to be separated.

The process of the invention is advantageously carried out in the following manner: the dilute acid, the concentration of which is generally in a range of from 20 to 40% but may be higher or lower, is concentrated in the first step to about 60–70% strength under a pressure of from 20 to 50 mm Hg. After optional cooling and separation of precipitated salt, the acid is forwarded to the second process step consisting of a packed column or a plate column, where it is treated with a countercurrent flow of a mixture of steam and acid vapor. Alternatively, several series-connected jet mixers may be used instead of a column. The acid having attained a higher concentration in the second step is subsequently mixed in a jet mixer with superheated steam having a temperature of from 600 to 700° C. In the two-phase mixture thus formed, a temporary equilibrium temperature of 290°–300° C. is established. A necessary condition for a rapid exchange of material and heat is an intense intermixing of the two phases. After isolation of the acid having attained a still higher concentration in this step, the vapors are forwarded to the sump of the column of the second step from where they flow countercurrent to the acid and leave this column at its top at a temperature of from about 120° to 165° C. The vapors are subsequently compacted or used directly for heating the circulating cyclone evaporator of the first step. A further increase of concentration is obtained when the acid discharged from the third step is depressurized at about 30 mm Hg in a depressurizing device. The operations of the second and third steps are carried out under normal pressure. A slightly reduced pressure, for example reduced by 15 to 30 mm Hg, may be used, especially in order to prevent the escape of sulfuric acid vapors in case of leaks in the apparatus. The amount and the temperature of the superheated steam depend on the evaporation efficiency and the concentration of the regenerated acid. On the other hand, the amount of steam depends on the starting concentration of the acid when entering the circulating cyclone evaporator. The individual steps are operated in such a manner that the energy of the steam is fully utilized.

According to the process of the invention, a sulfuric acid having up to 97% strength is obtained from dilute contamined sulfuric acid.

The present invention will be better understood by reference to the accompanying drawing which represents an exemplified embodiment in the form of a flow scheme:

A 20% sulfuric acid containing salt and organic impurities and having a temperature of 20° C. is fed to the heat exchanger 1, where it is preheated by means of the condensate of the circulation evaporator 2, before it is forwarded to the latter one. The vapor ascending from the still 3 is condensed in the condenser 4, and inert gases are eliminated by the vacuum pump 5 which ensures a reduced pressure during the evaporation. Part of the acid leaving the still 3 is mixed with the acid leaving the heat exchanger 1 and fed to the circulation evaporator 2. The remaining part of the acid leaving the still 3 (which corresponds to the amount forwarded from heat exchanger 1 to circulation evaporator 2), in the case where it contains inorganic salts, is forwarded by means of pump 6 to the agitation vessel 7 provided with a cooling jacket. Precipitated inorganic salt is separated in the centrifuge 8. The acid leaving the latter centrifuge is forwarded to the heat exchanger 10 by means of pump 9, and from there to the second step, that is, the column 11, via duct 21. The acid fed in at the top of the column 11 is treated with a countercurrent flow of a mixture of steam and acid vapor. The acid leaving the sump of the column 11 is forwarded via duct 22 to the third step, that is, the jet mixer 12, where it is thoroughly intermixed with superheated steam being heated to a temperature of from 600° to 700° C. in heater 13, thus forming a two-phase mixture having a temporary equilibrium temperature of about 290°–300° C. This two-phase mixture is forwarded via duct 23 to the separator 14, where the acid is isolated. The mixture of steam and acid vapor leaving the separator 14 at the top is fed to the bottom of column 11 via duct 24. The vapor leaving the column 11 at its top are fed via the blower 18 to the circulation evaporator 2 in order to serve as heating means. The acid leaving the separator 14 may be depressurized in a suitable depressurizing device, for example the flash chamber 19 which, at its vapor end, is connected to the outlet of the circulation evaporator 2 via duct 25. The steam obtained in the depressurizing operation is utilized in the first step as direct heat conductor. The liquid phase is passed through the heat exchanger 10 by means of pump 20, where it yields a great part of its heat, while the remaining heat is dissipated via the heat exchanger 15. Depressurizing in the flash chamber 19 enables one to obtain a final concentration of 97% of sulfuric acid. Oxidants are fed to the individual steps by means of pumps 16 and 17. Duct 26 serves for the feed of low pressure steam and duct 27 for the feed of fuel.

The following examples illustrate the invention.

EXAMPLE 1

422 kg/h of 23.4% sulfuric acid having a black color and a content of 0.6% C and containing organic impurities is fed at 20° C. to an apparatus as described above, but without agitation cooler 7, centrifuge 8 and flash chamber 19. In the circulation evaporator 2, operating under a pressure of 43 mm Hg, 255 kg/h of water are distilled off. The sump of the evaporator having a temperature of 83° C. and containing 59% $H_2SO_4$ is heated to 110°–120° C. by heat exchange with the hot 94% sulfuric acid in heat exchanger 10 and subsequently fed to the top of the column 11 from where the vapors escape at a temperature of 135° C. The acid leaving the sump of the column 11 is mixed in the jet mixer 12 with 263 kg/h of superheated steam having a temperature of 620° C. In the separator 14, a temperature of 290° C. results. 4.6 kg/h of 100% $HNO_3$ are fed to the separator as oxidant, that is, 4.4% relative to the concentrated acid, and the C content of the 94% acid amounts then to 0.05%. The acid is practically colorless. When the flash chamber 19 is used, the concentration of the acid discharged increases to 96%, and simultaneously, the temperature drops to 205° C.

EXAMPLE 2

A dilute sulfuric acid containing $FeSO_4$ is composed as follows: 31% $H_2SO_4$, 65.4% $H_2O$ and 3.6% $FeSO_4$. After evaporation according to Example 1, (the apparatus containing heat exchanger 7 and centrifuge 8 but not flash chamber 19) a hot acid is formed in this first step which contains 70% $H_2SO_4$, 22.7 $H_2O$ and 7.3% salt. After cooling and separating the precipitated iron sulfate, the acid is dehydrated in the following steps by means of hot steam to have a final concentration of 94%.

EXAMPLE 3

656 kg/h of a sulfuric acid of 29% $H_2SO_4$ strength and a content of 1.0% C and containing organic impurities are fed to the circulation evaporator 2 according to Example 1. At a sump temperature of 95° C. and under a pressure of 40 mm Hg, 390 kg/h of water are distilled off, thus establishing an acid concentration of 72% $H_2SO_4$. As oxidant, 6% of $HNO_3$ (100% strength) are fed to the sump, relative to the acid used at the start. In the second and third steps, the acid is concentrated further by means of 410 kg/h of a countercurrent of superheated steam having a temperature of 600° C. The temperature in the separator 14 is 285° C., the temperature at the top of the column 11 155° C. In order to oxidize the remaining impurities, 12.3% $H_2O_2$ (30% strength), relative to the concentrated acid, is added to the separator 14. The colorless acid discharged (206 kg/h) has a concentration of 93% $H_2SO_4$.

EXAMPLE 4

In the apparatus as described in Example 1, 258 kg/h of a 44% sulfuric acid having a black-brown color and a content of 0.43% C which contains impurities and 21 kg/h of $H_2O_2$ (30% strength) are fed to the circulation evaporator 2 operating under a pressure of 50 mm Hg. At a water distillation of 210 kg/h and a sump temperature of 91° C., an acid concentration of 70% is attained. The percentage of $H_2O_2$ added is 12.8%, relative to the 70% acid, which latter one is fed in an amount of 164 kg/h to the column 11, and it is further dehydrated by feeding 210 kg/h of superheated steam having a temperature of 620° C. to the jet mixer 12. The temperature in the separator 14 is 290° C. and at the top of the column 11 165° C. 4% of $HNO_3$ (100% strength), relative to 94% $H_2SO_4$, are added in the separator 14. A colorless 94% sulfuric acid having a content of 0.04% C is obtained.

EXAMPLE 5

In the apparatus as described in Example 1, a dilute acid having the following composition: 36.3% $H_2SO_4$, 58.2% $H_2O$ and 5.5% $Na_2SO_4$ is evaporated in the circulation evaporator 2. The hot acid contains 66.3% $H_2SO_4$, 23.7% $H_2O$ and 10% $Na_2SO_4$. The salt precipitates on cooling and is eliminated. Subsequently, the acid is further concentrated in the subsequent second and third step by means of hot steam, so that a 94% $H_2SO_4$ containing about 1% $Na_2SO_4$ is obtained.

What is claimed is:

1. A process for the regeneration of dilute sulfuric acid containing organic impurities comprising concentrating the dilute acid in a first step by indirect heat exchange with vapors produced in a second step, concentrating the acid leaving the first step in the second step with a countercurrent flow of a steam and acid vapor mixture produced in a third step, treating the acid from the second step in the third step by atomizing said acid in a stream of superheated steam of a temperature of about 600° to 700° C., recovering the resultant mixture at a temperature between about 285° C. and 300° C., at an acid concentration of about 93 to 96%, separating said acid at said acid concentration introducing the remaining steam and acid vapor mixture from the third step into the second step, and adding an oxidizing agent to at least one of the first, second or third steps.

2. The process as claimed in claim 1 which comprises cooling the acid from the first step before forwarding it to the second step, and separating precipitated salt therefrom.

3. The process as claimed in claim 1, which comprises flashing the regenerated acid and recycling the mixture of steam and acid vapors formed to the first step.

4. The process as claimed in claim 2, which comprises flashing the regenerated acid and recycling the mixture of steam and acid vapors formed to the first step.

* * * * *